United States Patent

[11] 3,628,319

| [72] | Inventor | Bobby G. Moore |
| | | Rt. 4, Conway, S.C. 29526 |
| [21] | Appl. No. | 827,454 |
| [22] | Filed | Apr. 24, 1969 |
| [45] | Patented | Dec. 21, 1971 |

[54] METHOD AND APPARATUS FOR HARVESTING TOBACCO
28 Claims, 23 Drawing Figs.

[52] U.S. Cl. ................................................. 56/27.5
[51] Int. Cl. ........................................... A01d 45/16
[50] Field of Search............................................56/27.5, 17, 328, 327, 330, 1; 180/6.44; 198/33

[56] References Cited
UNITED STATES PATENTS

| 2,693,070 | 11/1954 | Gaut et al. ................... | 56/27.5 |
| 2,876,610 | 3/1959 | West et al. .................... | 56/27.5 |
| 3,093,949 | 6/1963 | Splinter ........................ | 56/27.5 |
| 3,184,908 | 5/1965 | Rust .............................. | 56/330 |
| 3,453,815 | 7/1969 | Harrington et al............ | 56/27.5 |
| 3,466,856 | 9/1969 | Rakestraw.................... | 56/27.5 |
| 3,507,103 | 4/1970 | Pickett et al.................. | 56/27.5 |
| 2,635,408 | 4/1953 | Cox .............................. | 56/27.5 |

*Primary Examiner*—Russell R. Kinsey
*Attorney*—Burns, Doane, Swecker & Mathis

ABSTRACT: A self-propelled, mechanical tobacco harvester with novel, variable, swath-cutting means, automatic guidance system, stalk-supporting means, leaf-orienting means and variable height containers, the operation station and cutting means being cantilevered from the harvester frame at a predetermined height.

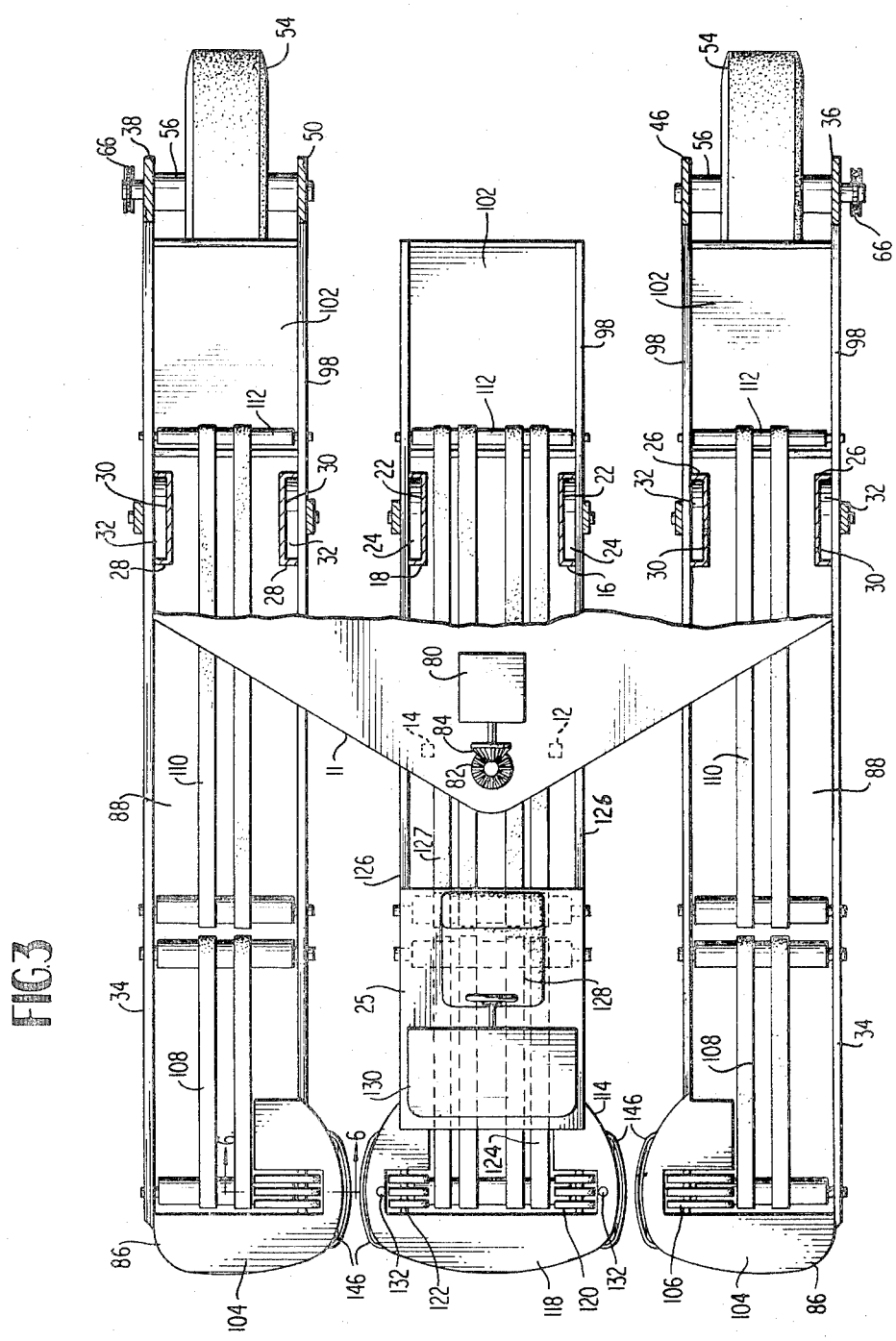

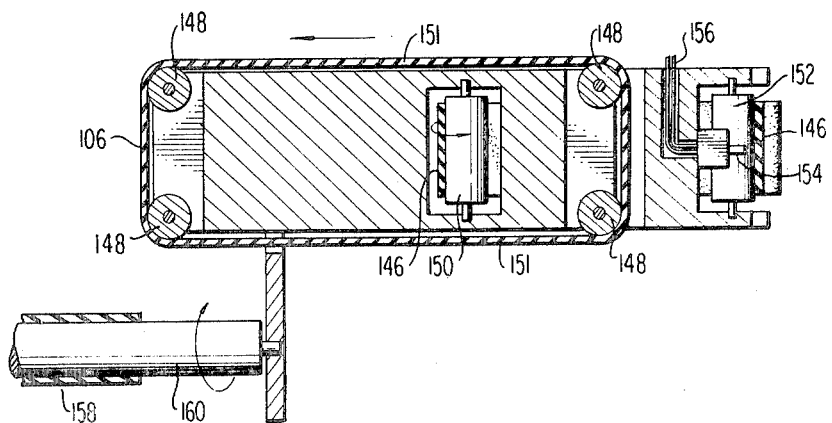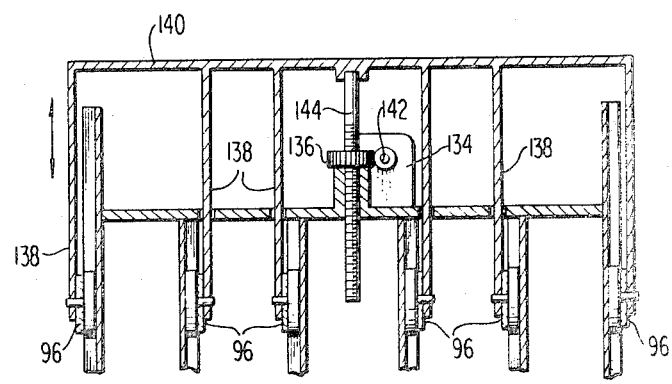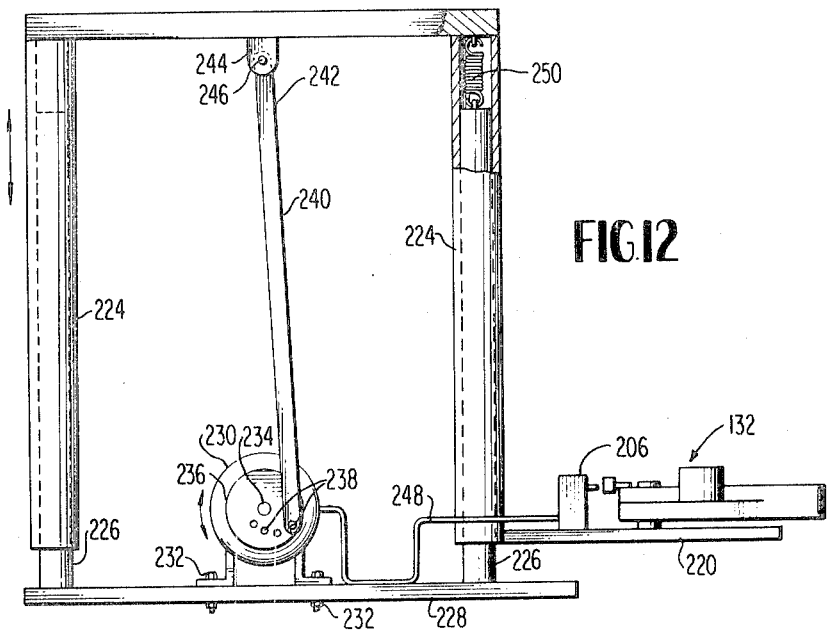

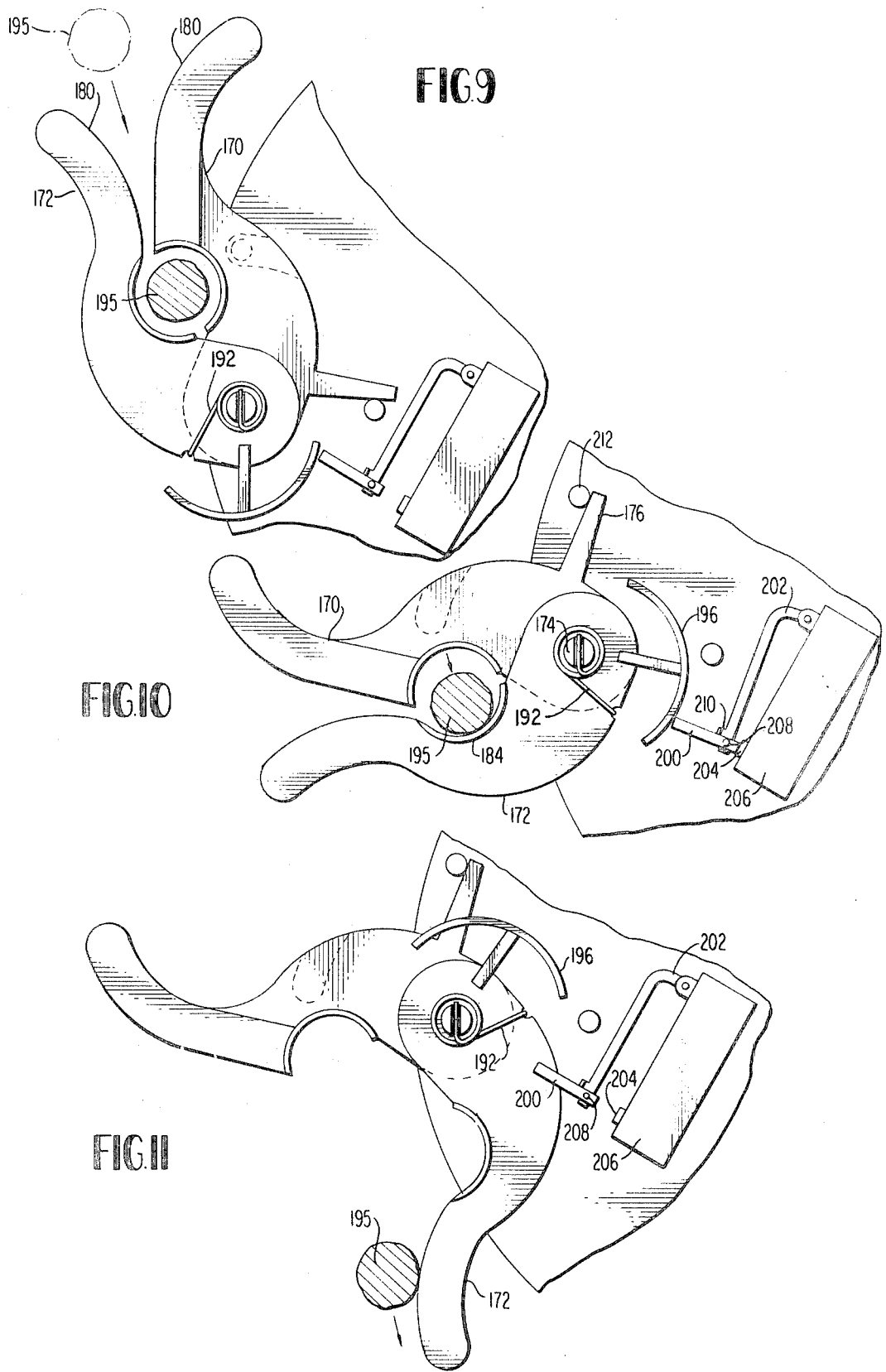

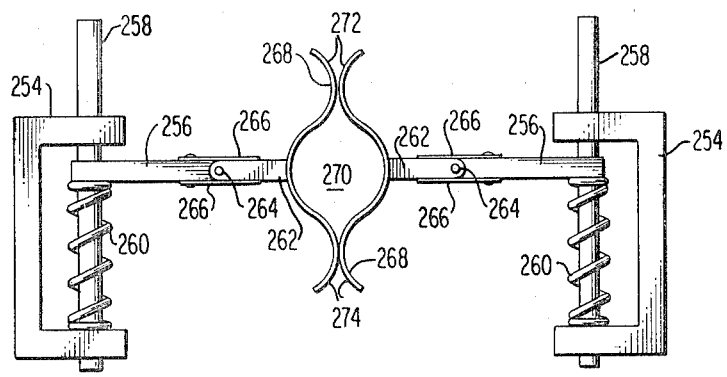
FIG.13
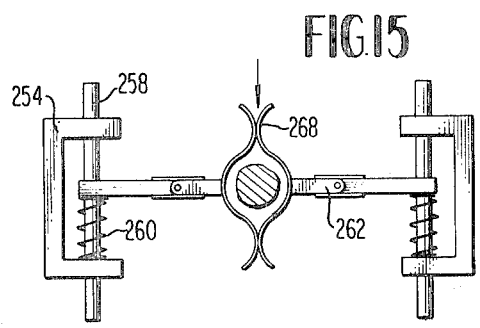
FIG.15
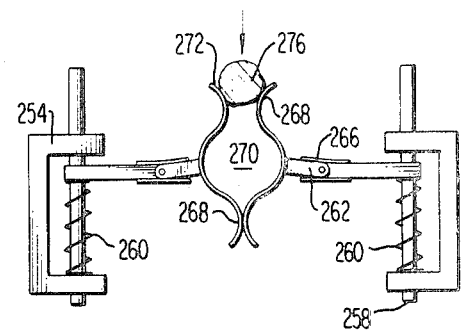
FIG.14
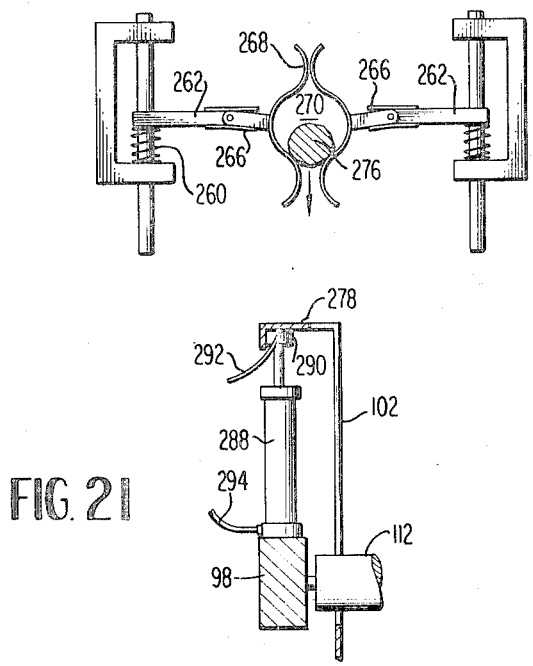
FIG.16
FIG.21
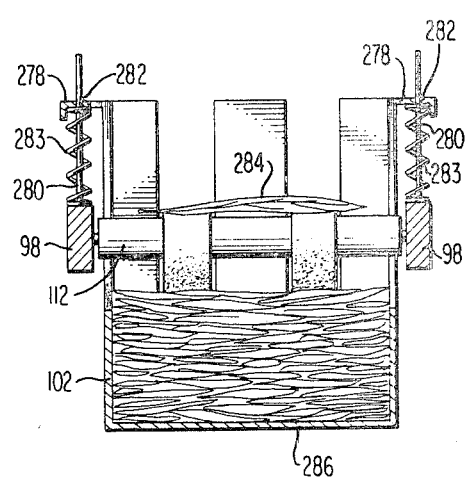
FIG 20

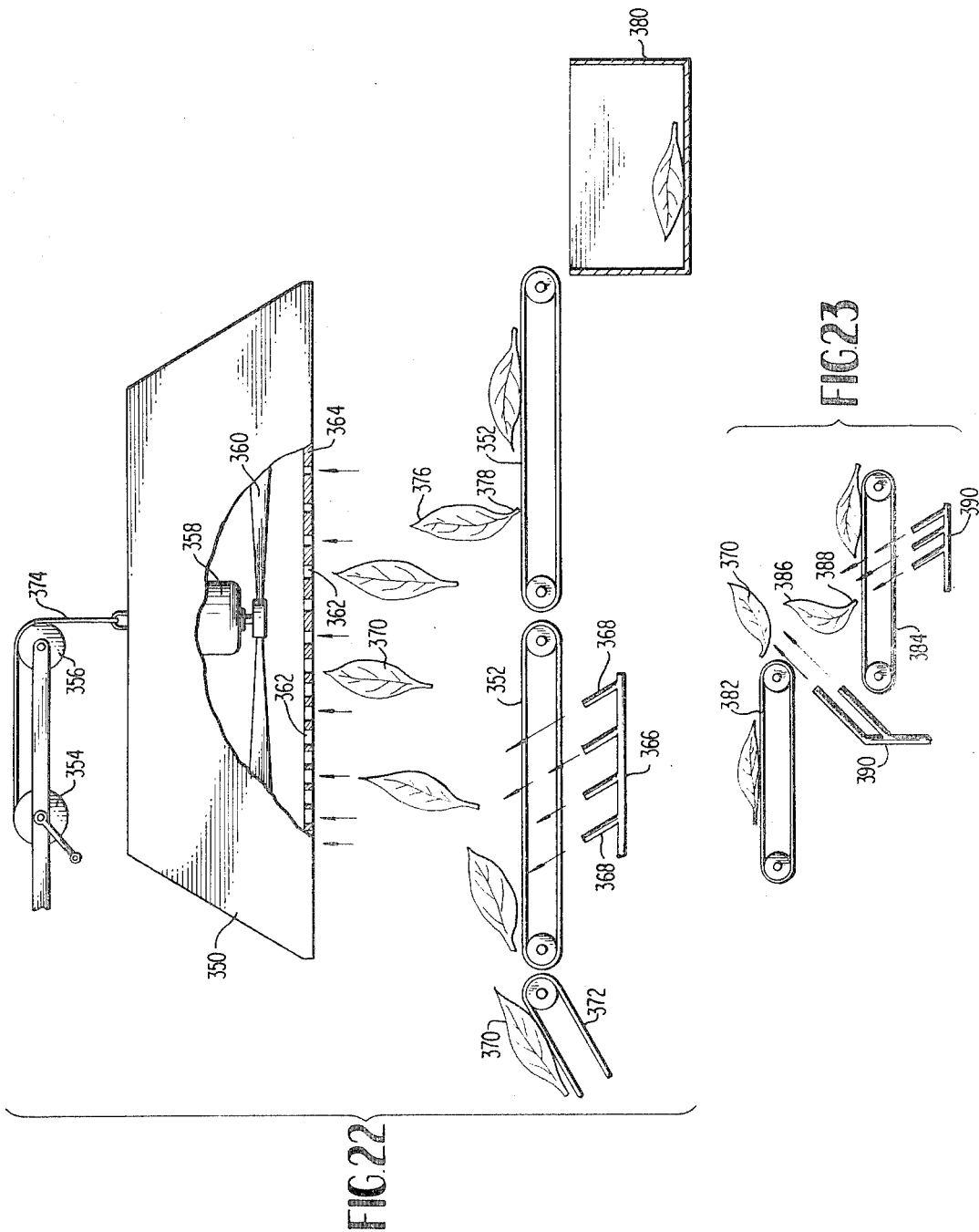

METHOD AND APPARATUS FOR HARVESTING TOBACCO

BACKGROUND OF THE INVENTION

The present invention relates to tobacco harvesters and more particularly to a method and apparatus for automatically defoliating a selected vertical portion of an individual tobacco plant.

Tobacco of the bright leaf or flu-cured type grows to a height of 6 feet or more in the form of a single vertical stalk and numerous leaves extending upwardly and outwardly from the stalk at an angle of approximately 50° from the horizontal until they droop of their own weight. The tobacco leaves are spaced spirally on the stalk throughout 360° and ripen progressively from the bottom to the top of the stalk over a period of 6 to 8 weeks. The leaves are desirably harvested only at a particular stage in the ripening process. This desideratum is achieved only by a number of separate harvesting operations.

In the hand "cropping" or harvesting of tobacco, the uppermost leaf adjudged by its color to be ripe for harvesting is grasped with the palm of the hand and that leaf and the leaves lower down the stalk are snapped therefrom by a sharp, downward and grasping movement of the hand. The work is extremely hot, dusty and gummy from the bleeding of the leaves.

One problem in the hand "cropping" or defoliating of tobacco plants is that the stalk may be damaged to the detriment of the unripened and immature leaves to be harvested at a later date. Damage to the stalk occurs more often, of course, with the use of the unskilled and disinterested farm labor generally available for employment for this purpose. Availability of labor of any kind is, moreover, a vexing and continually increasing problem.

While the steps of transplanting, cultivating, topping and suckering tobacco plants have been mechanized to reduce the labor requirements, attempts to mechanize the harvesting or defoliating process have been generally unsatisfactory. Farm labor is today difficult to obtain and the cost of the labor necessary to pass through a field four, six or more different times, removing only those ripened leaves from the stalk, is a disproportionately large part of the total cost of raising tobacco.

It is accordingly an object of the present invention to provide a novel method and apparatus for the mechanized defoliation of a selected vertical section of a tobacco plant.

Attempts to mechanize the harvesting of tobacco have been made. In these prior art tobacco-harvesting machines the defoliation is generally accomplished by means of a downward cutting or striking motion. Damage to the stalk has often resulted from this downward motion, particularly where the cutting edges have become dulled through use during the harvesting operation. As earlier stated, the leaves of the tobacco plant grow upwardly and outwardly from the stalk. Should the leaf not be cleanly cut or broken, the stalk may be torn or otherwise damaged, to the detriment of the immature leaves yet to be harvested. Examples of the downwardly defoliating harvesting tobacco devices are those illustrated in the Wilson U.S. Pat. No. 2,816,411, the Hawkins U.S. Pat. No. 2,696,069, and the West et al. U.S. Pat. No. 2,876,610.

While attempts have been made to harvest the leaves with an upward cutting motion, these devices generally comprise cooperating U-shaped cutter elements which rotate inwardly towards the stalk of the tobacco and upwardly and away therefrom to carry the leaves thus cut to suitable conveying means. Apparatus of this type is generally limited to the leaves on the tips of the tobacco plant due to the damage to the leaves above those it is desired to harvest. Space limitations beneath the bottom leaves or lugs of the tobacco plant also prevent the general utilization of this type of device as does a lack of control over the length of the swath. Apparatus of this type is described, for example, in the Splinter U.S. Pat. No. 3,093,949.

It is accordingly another object of the present invention to provide a novel method and apparatus for harvesting the leaves of a tobacco plant with a vertically upward cutting motion, which prevents damage to the stalk, and without damage to the unripened leaves further up the stalk.

The cutting or stripping apparatus of the prior art tobacco-harvesting machines generally includes a plurality of wheels journaled for rotation in a horizontal plane about a vertical axis on opposite sides of the row of tobacco plants. The wheels customarily include a plurality of radially outwardly extending arms or fingers which are engaged by the stalk of the tobacco plant and rotate with relative movement between the harvester and the plants. The arms from the wheels on opposite sides of the tobacco plant cooperate to encircle the stalk and, at a predetermined point in the relative movement between the stalk and the apparatus, are activated to move vertically downward to strip the leaves from the stalk. Apparatus of this type is illustrated in the aforementioned West et al. and Hawkins Patents. The cutting operation of these prior art harvesters thus requires cooperation between apparatus located on opposite sides of the tobacco plants.

Still another object of the present invention is to provide a novel cutting apparatus operable from one side of the tobacco plant.

Yet another object of the present invention is to provide a novel cutting head in which the cutting edges are quickly and easily replaced while the apparatus is in the field.

Yet still another object of the present invention is to provide a novel cutting head whose operation is controlled by the stalk of the plant being defoliated.

It is desirable to steady the plant during the stripping or harvesting operation due to the flexibility of the stalk and the ease with which it may be damaged. To this end, endless chains with horizontally extending fingers have been utilized to limit the fore and aft movement of the stalk. These prior art devices have only generally surrounded and have not provided positive control of the tobacco stalk at the height at which the defoliating occurs.

It is accordingly a further object of the present invention to provide a novel method and apparatus for positively gripping the stalk of a tobacco plant at the height and at the time of defoliation by means of cooperating endless conveyor belts.

The frames of each of the aforementioned prior art harvesters have been of sufficient height so that one or more rows of tobacco plants may pass therethrough. It is the usual practice to locate the operator's control station atop the platform and substantially rearward of the cutting operation. With the operator so located, his vision of the cutting operation and of the alignment of the harvester with respect to the rows of plants may be obstructed by the leaves of the plants.

It is still another object of the present invention to provide a self-propelled tobacco harvester in which the operator's control station is substantially at the height of and immediately adjacent to the harvesting operation whereby the function of vehicle guidance and cutting apparatus control are greatly simplified.

As earlier mentioned, apparatus has been developed for transplanting tobacco plants. The transplanting normally occurs two rows at a time and the rows are generally quite straight and necessarily parallel. It is still a further object of the present invention to automate the control of the tobacco harvester whereby the harvester automatically follows the rows of tobacco plants deriving its positional control directly therefrom.

It is another object of the present invention to combine the functions of harvester guidance and stalk steadying in a system responsive successively to the position of the next tobacco stalk in the row.

Conveyor systems have been utilized in the prior art to transport the leaves harvested to a suitable container carried by the harvester frame. The vertical height of the end of the conveyor over the container, and thus the size of the container, is limited by the tendency of the leaves to fall butt first, due to the weight concentrated there. If the leaf falls far enough to assume a butt down attitude, the butt of the harvested leaf may damage those leaves already in the container, since the leaves are quite thin and easily penetrated. This difficulty has been overcome in the present invention by the controlled spacing of the height of the conveyor with respect to the bottom of the container and more particularly as a function of the weight of the leaves accumulated therein.

The concentration of the weight of the broad leaves of the tobacco plant into the stem is utilized in the present invention to uniformly orient the harvested leaves greatly facilitating the subsequent handling thereof. This orientation is accomplished by dropping the harvested leaves onto a moving conveyor from a height sufficient for the resistance of the air on the broad leaves and the concentration of weight in the butt of the stem to orient each leaf butt down prior to contact with the conveyor. As an alternative, the present invention provides for the creation of an updraft sufficient to lift the major portion of the leaves above the conveyor.

The above and other objects and advantages will be readily apparent upon a reading of the following detailed description of the illustrative embodiment shown in the appended drawings.

THE DRAWINGS

FIG. 3 is a top plan view of the harvester of FIG. 1 with a section taken through lines 3—3 of FIG. 1;

FIG. 4 is a section taken through lines 4—4 of FIG. 1 illustrating the movable platform adjusting mechanism;

FIG. 6 is a section taken through lines 6—6 of FIG. 1 illustrating the automatic guidance system;

FIGS. 9, 10 and 11 illustrate the operation of the cutting head of FIGS. 7 and 8;

FIG. 12 is a front elevation view of one embodiment of the cutting head lifting apparatus;

FIG. 13 is a top plan view of a second embodiment of the cutting head;

FIGS. 14, 15 and 16 illustrate the operation of the cutting head of FIG. 13;

FIG. 20 is a section taken through the harvested leaf container of FIG. 1 illustrating one embodiment of the container height adjusting mechanism;

FIG. 21 is a section illustrating a second embodiment of the container height adjusting mechanism;

FIG. 22 is one embodiment of the leaf orienting apparatus of the present invention; and FIG. 23 is a second embodiment of the apparatus of FIG. 22.

THE VEHICLE

Figure 1:
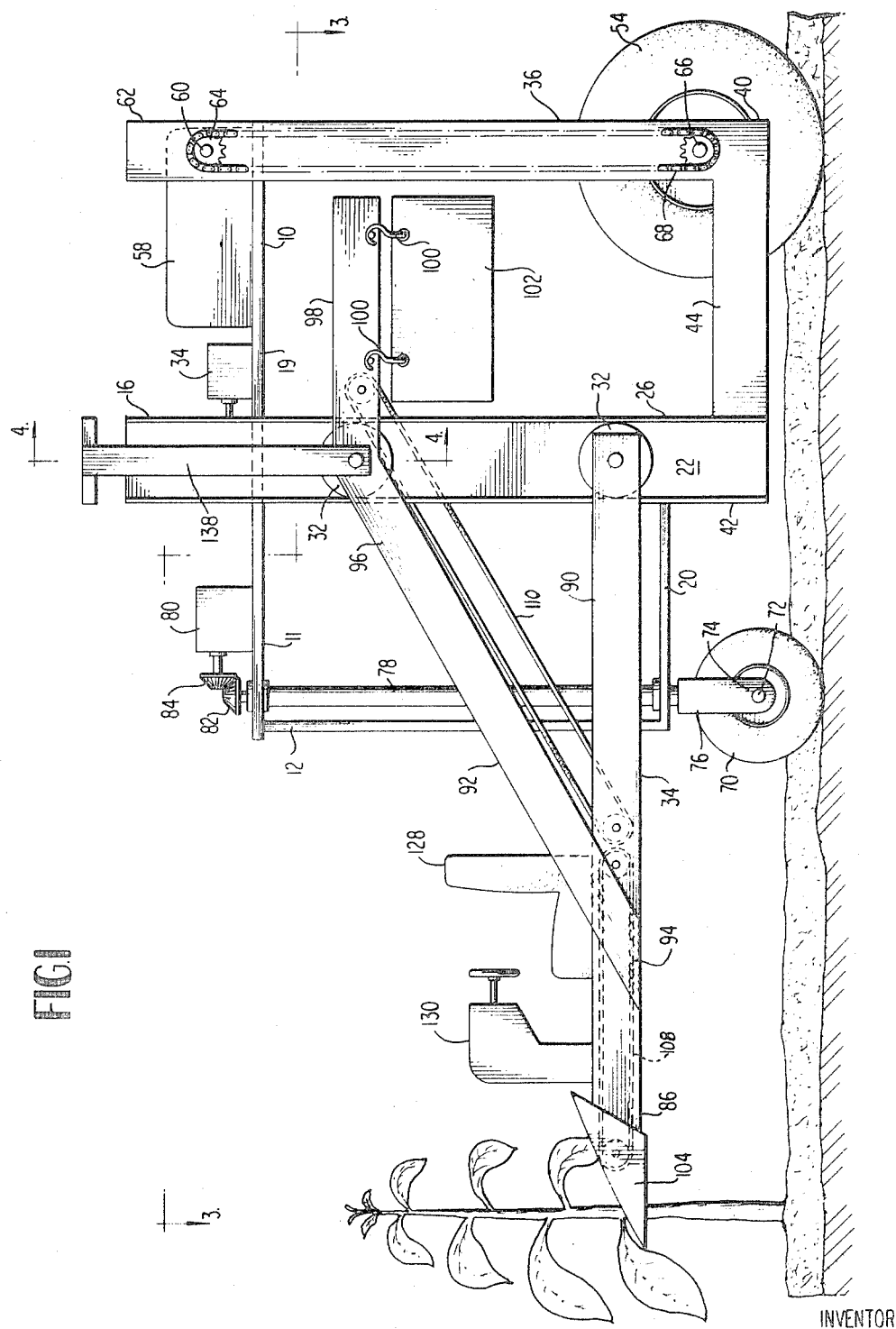
FIG. 1 is a side elevation view of one embodiment of the harvester of the present invention.
Figure 2:
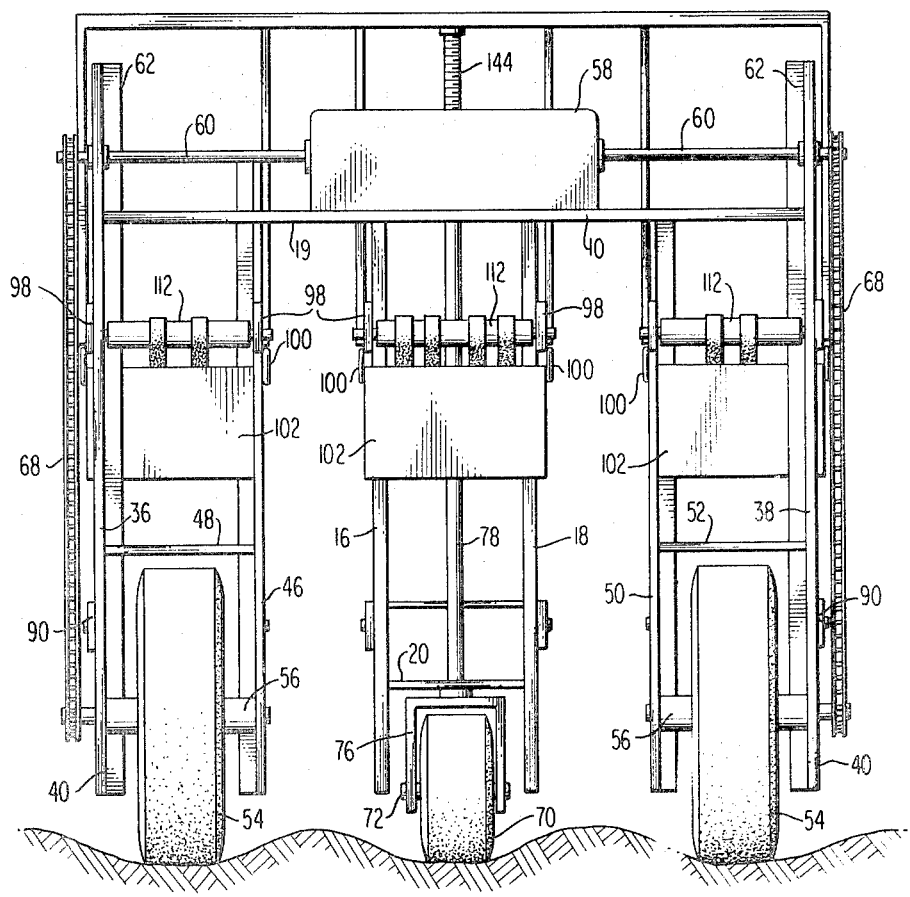
FIG. 2 is a rear elevation view of the harvester of FIG. 1.

With reference now to FIGS. 1, 2 and 3 of the drawings, a preferred embodiment of the present invention includes a laterally symmetrical, trapezoidal shaped, upper platform 10. The forward triangular portion 11 of the platform 10 is supported by a boxlike frame structure comprising a pair of transversely spaced, vertical supports 12 and 14 depending from the forward apex of the triangular portion 11, and a second pair of transversely spaced vertical supports 16 and 18 depending from the platform 10 in the approximate center of the base of the triangular portion, i.e., the area between the forward corners of the rectangular portion 19 of the platform 10. The four vertical supports 12, 14, 16 and 18 may be provided with a rigid base member 20. Additional bracing members (not shown in the interest of clarity) suitable for establishing the desired structural rigidity may also be provided here, as well as in connection with the other structures hereinafter described.

The two rearward supports 16 and 18 of the triangular portion 11 supporting structure may be provided on their laterally outward facing surfaces 22 with grooves suitable for receiving the wheels 24 of the central movable platform 25 supporting frame, as will be subsequently described in greater detail in connection with FIGS. 1, 3 and 4.

The rectangular or rearward portion of the platform 10 is supported by a generally rectangular frame structure on each side thereof. More specifically, a pair of vertical supports 26 and 28 depend respectively from the forward corners of the rectangular portion 19 of the upper platform 10. The oppositely facing surfaces 30 of the supports 26 and 28 are, like those of the supports 16 and 18, grooved to receive the wheels 32 of the two movable side platforms 34 supporting frame, as will be subsequently described. Structural rigidity may be provided by any suitable means (not shown).

The vertical supports 36 and 38 which depend from the rear corners of the upper platform 10 may be rigidly connected at their lower extremities 40 to the lower extremities 42 of the forward vertical supports 26 and 28 by a suitable structural brace 44.

As shown in FIGS. 2 and 3, an additional vertical support 46 depends from the rear of the upper platform 10 in proximity to, but laterally spaced from, the left rear vertical support 36. A transverse brace 48 and others, for the interest of clarity not shown, may be provided to add to the rigidity of the supporting structure described. Similarly, a vertical support 50 and a transverse brace 52 may be provided at the right rear of the platform 10 in proximity to, but laterally spaced from, the vertical support 38.

The above structural members and those hereinafter to be described may be of conventional materials such as steel and may be mutually secured by any suitable conventional means such as threaded fasteners, rivets, welding, or the like.

Movement of the frame as thus described is made possible by the support thereof at the rear corners of the platform 10 by a pair of large conventional balloon tires 54. The tires 54 are journaled, in a manner well known in the art, for rotation on axles 56 which extend respectively between the vertical support members 36 and 46 and between the vertical supports 38 and 50.

Power for imparting driving rotation to the tires 54 is derived from a conventional, vehicular source such as an internal combustion, gasoline or diesel engine 58 mounted in a conventional manner on top of the upper platform 10 at the rear thereof. The drive shaft 60 of the engine 58 may be journaled for rotation through upward extensions 62 of the vertical members 36 and 38. The power of the engine 58 may be transmitted from the shaft 60 to the tires 54 by means of sprocket wheels 64 and 66 and an endless chain 68. The source of power 58 may, of course, be independently clutched to each of the tires 54 by a conventional, electrically controlled clutch (not shown), if so desired. Driving power may then be supplied to either tire 54 separately, or to the two tires simultaneously.

A smaller tire 70 is provided at the front of the harvester frame thus described for guiding purposes. As shown in FIGS. 1 and 2, the tire 70 is journaled in a conventional manner for rotation on a shaft 72 which extends between the lower ends 74 of a forklike member 76. The shaft 78 of the member 76 extends upwardly through the base member 20 and through the upper platform 10 near the forward apex of the triangular portion 11.

The angular position of the guide tire 70 with respect to the axis of the harvester, and thus the direction of travel thereof, is controlled by the rotational position of the shaft 78 acting through the fork member 76. The position of the member 76 is in turn controlled by a suitable electric motor 80 or the like mounted in a conventional manner on top of the upper platform 10. The driving connection between the motor 80 and the shaft 78 may be conventionally established by means of beveled gears 82 and 84, although other suitable control means may be used if desired.

The harvester as described is thus operable to transverse the length of a field in which tobacco has been planted with the control wheel 70 in the furrow between two adjacent rows of tobacco plants and the driving wheels 54 located respectively in the furrows on the other side of those two adjacent rows. The vertical height of the support members must be such that each of the two rows of tobacco plants thus straddled by the harvester may pass between the control wheel 70 and one of the drive wheels 54 without interference or damage to the plant from the platform 10 or the containers which may be hung therefrom in a manner to be described infra.

Figure 5:
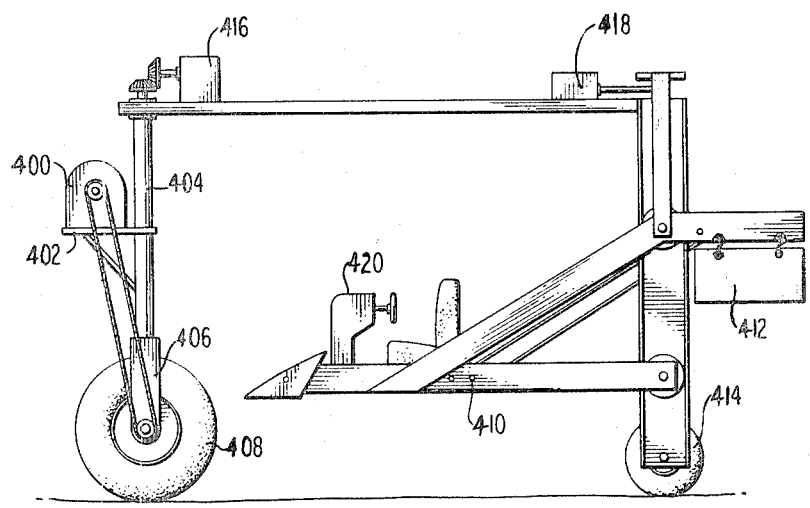
FIG. 5 is a side elevation view of a second embodiment of the harvester of the present invention with front wheel drive.

An alternative embodiment of the harvester is illustrated in FIG. 5 wherein the prime source of power, a motor 400, is mounted atop a platform 402 carried by the shaft 404 of the fork 406 which controls the position of a large tire 408.

In this embodiment, the cantilevered movable platform 410 may support the container 412 for the harvested leaves.

The tires 414 supporting the frame at the rear thereof may be smaller in this embodiment. The motor 400 supplying the driving power, the motor 416 controlling the angular positioning of the shaft 404, and the motor 418 controlling the height of the movable platform 410 above the level of the ground may be electrically controlled from the control console 420 in the manner described infra in connection with the embodiment of FIGS. 1, 2 and 3.

THE MOVABLE PLATFORMS

The control station and the actual harvesting apparatus of the present invention extend forwardly in three sections from the harvester frame as thus far described. The two outer structures or movable platforms 34 may be mirror images of each other and include a nose portion 86 and an elongated conveyor portion 88 cantileverly supported from the paired vertical support members 26 and 28.

As shown in FIG. 1, the nose portion 86 is supported by a generally horizontal cantilever beam 90 to which the wheels 32 are journaled. Diagonal braces 92 may be secured at one end 94 to one of the beams 90 and at the other end 96 to a generally horizontal, rearwardly extending member 98. A second wheel may be journaled to each of the members 98 at the junction of the braces 92. Upon these members 98 may be hung in a conventional manner, e.g. by hooks and eyes 100, a container 102 for the tobacco leaves harvested. This container 102 need not be hung at a height sufficient for the individual tobacco plants to pass thereunder as the harvester traverses the field, since each container 102 is suspended between two rows of plants.

As illustrated in FIGS. 1 and 3, each of the nose portions 86 of the side movable platforms 34 is provided with a nose 104 shaped so as to lift the leaves of the tobacco plant into a substantially horizontal position with respect to the attachment of the stem thereof to the central stalk of the plant for the cutting operation hereinafter described. In addition, each of the nose portions 86 supports a short section 106 of a transverse conveyor for transporting the harvested leaves from the stalk outwardly to the first longitudinal section 108 of the conveyors. The harvested leaves are thus conveyed along the movable platforms 34 to a second longitudinal section 127 of the conveyors which extends upwardly and rearwardly over a shaft 112, over the container 102 into which the harvested leaves are deposited.

The shaft 112 may be journaled between the members 98 in a conventional manner. The driving power for all of the conveyor systems may be applied thereto from any suitable source such as the engine 58. While not shown for the sake of clarity, the driving connection may be established through an endless chain directly connected to a sprocket on the shaft 60 of the engine of prime mover 58. Power for the subsequent sections of the conveyors may in turn be derived from the rollers of the adjacent section by means of conventional gearing or from the motor 58 by any conventional mechanical connection.

With reference now to FIG. 3, the central movable platform 25 may, in the manner described in connection with the side movable platform 34, be supported by cantilevered beams and braces 126 and the wheels 24 journaled thereto. These wheels 24 are adapted to roll in the grooved surfaces 22 of the vertical supports 16 and 18 as earlier described.

Additionally, the central moveable platform 25 comprises a nose portion 114 and longitudinal conveyor portions 124 and 127. The nose portion 114 may also be provided with an appropriately shaped nose 118 to assist in lifting the inwardly facing leaves of the individual tobacco plants to the height of the connection of the stem thereof to the main stalk for the cutting operation.

The nose portion 114 additionally contains left-hand and right-hand, transverse conveyor sections 120 and 122 which operate to convey the harvested leaves inwardly to the centrally disposed, longitudinal conveyor section 124. The conveyor section 124 in turn delivers the harvested leaves to the forward end of a second longitudinal conveyor section 127 driven by the roller 112 in the manner earlier described. The driving connection between adjacent sections of the conveyor system may be established in any well-known manner, although it is desirable to operate the conveyors at the overland speed of the harvester. The operator's seat 128 and control panel 130 may, as shown in FIGS. 1 and 3, be mounted over the longitudinal conveyor sections 124 and 127.

In addition to the above, the nose portion 114 of the central movable platform 25 carries the cutting heads 132 and the stalk gripping and automatic control apparatus described infra.

The vertical height of the movable platforms 25 and 34 may be adjusted with respect to the level of the ground by means illustrated in FIG. 4. Referring now to FIG. 4, a conventional source of power, such as an electric motor 134, and a conventional screw jack 136 may be mounted on top of the upper platform 10. As shown in FIGS. 1, 2 and 4, the ends 96 of the braces 92 of the movable platform are secured to the straps 138 depending from a common overhead member 140. As shown in FIG. 4, the screw jack 136 may be mounted between the upper platform 10 and the overhead member 104, and may be operated in a conventional manner by means of a worm gear on the shaft 142 of the motor 134 to control the vertical distance therebetween. Rotation of the shaft 142 of the motor 134 thus may operate to screw the shaft 144 of the screw jack 136 upwardly through an aperture in the platform 10, thereby causing the four depending straps 138 to lift the cantileverly supported, movable platforms 25 and 34. A suitable hydraulic motor may, of course, be utilized for this purpose.

With reference again to FIGS. 1 and 3, the operation of the harvester may be controlled in a conventional manner by an operator seated on the seat 128 before the control panel 130. Appropriate electrical wiring (not shown) may be provided from the control panel 130 to the motor control circuits associated with each of the power sources 58, 80 and 134 mounted on top of the upper platform 10. In this manner, the direction of travel, the speed and the height of the cantilevered movable platforms above the ground may be readily controlled by the operator from the seat 128. Appropriate pneumatic or hydraulic control apparatus may, of course, also be utilized.

AUTOMATIC GUIDANCE AND STALK SUPPORT

In addition to the conventional control effected by the operator by means of the control panel 130, the harvester of the present invention may be automatically controlled subject, of course, to a manual override by the operator. With reference to FIGS. 3 and 6, a belt 146 may be adapted to be driven around the lateral periphery of the converging noses 104 and 118 for this purpose. As shown in FIG. 6, the belt 146 lies generally in a vertical plane and is driven rearwardly in the area between the nose portions 104 and 118. By adjusting the speed of the belts 146 to the overland speed of the harvester, the belts 146 may be used to grip and to hold the stalk of the individual tobacco plant during the entire leaf-harvesting operation. Damage to the stalks may thus be prevented by the resiliency of the belt 146, and additional stability will be imparted during the harvesting operation. Since the stalk itself operates the cutting heads 132, this additional stability is a significant advantage over the methods utilized by known prior art devices.

As indicated in FIG. 6, the transverse conveyor belt section 106 may be driven about four rollers 148 in a conventional manner. The tobacco stalk gripping belt 146 may be driven over idler rollers 150 within the nose portion 86 between the horizontal portions 151 of the transverse conveyor section 106. The belt 146 may be driven about rollers 152 which project the belt 146 laterally into the passage between adjacent nose portions 114 and 86. The spacing between the rollers 152 may conveniently be relatively large so that the pressure of an improperly aligned stalk on the belt 146 would be sufficient to deflect the belt 146 inwardly with respect to the nose portion 86 to actuate the contacts of the switch 154. A control pulse may thereby be generated and relayed via wires 156 to the motor 80 atop the upper platform 10 to incrementally adjust the rotational positioning of the guide wheel 70.

The speed of the entire conveyor system is, as earlier explained, ideally that of the harvester, so that the stalks of the individual tobacco plants may be effectively gripped by the two belts 146 on opposite sides thereof and held stationary as the harvester travels past the tobacco plant. It has been found convenient to achieve this speed synchronism by deriving the power for the conveyor system in a conventional manner directly from the vehicular drive.

As shown in FIG. 6, the harvested leaves of the tobacco plants from the transverse conveyor section 106 are dropped onto the rearwardly moving belts 158 of the conveyor section 88. As earlier described, suitable conventional gearing (not shown) may be utilized to provide the driving connection between the forward roller 160 of the conveyor section 88 and one of the rollers 148 of the transverse conveyor section 106.

THE CUTTING HEAD

Figure 7:
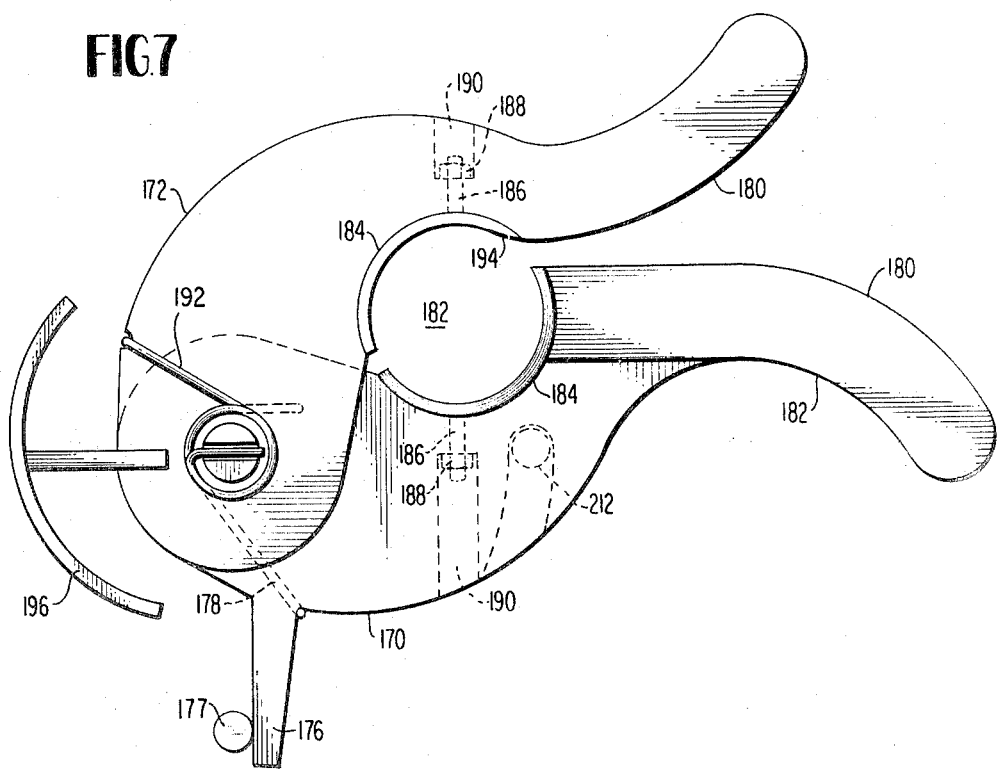
FIGS. 7 and 8 are top plan and side elevation views respectively of one embodiment of the cutting head of the present invention.
Figure 8:
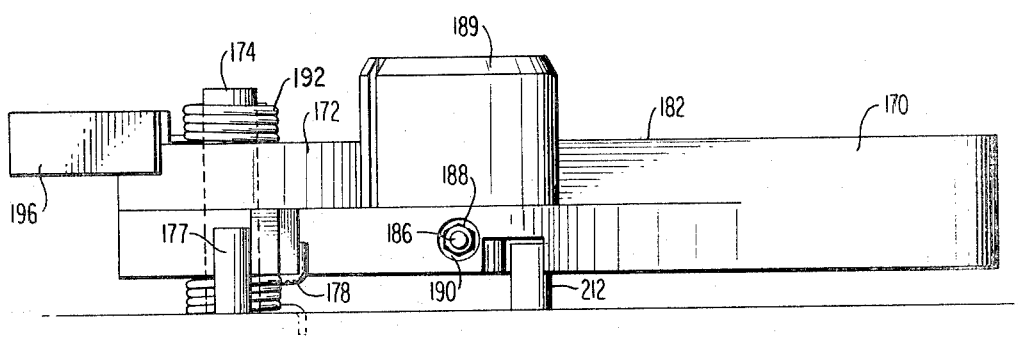

With reference to FIGS. 7 and 8, a preferred embodiment of the novel cutting head 132 of the harvester of the present invention is illustrated. The heat 132 comprises right-hand and left-hand members 170 and 172 journaled for rotation about a common shaft 174 in an overlying relation to each other. The shaft 174 may be mounted on opposite sides of the central movable platform 25, in proximity to the sides thereof, as shown in FIG. 3. The lower or right-hand member 170 may be provided with a mechanical stop 176 for abutment with a fixed post 177, and is spring biased by means of a coil spring 178 to return to this predetermined position with respect to the movable platform 25 of the harvester.

The right-hand and left-hand members 170 and 172 are provided with cooperating cam surfaces 180 for guiding the stalks of the individual tobacco plants therebetween and into the cutting area 182. To prevent damage to the stalk of the tobacco plants by the scissoring action of the right-hand and left-hand and left-hand members 170 and 172, the cam surface 180 of the lower or right-hand member 170 may be vertically built up over a portion 182 thereof to provide cooperating cam surfaces 180 at the same vertical height. The vertically built-up portion 182 desirably extends the length of the cam surface 180.

The cutting area 182 is defined by semicircular grooves in the right-hand and left-hand members 170 and 172 rearwardly adjacent to the cam surfaces 180. The grooves cooperate to form the generally circular aperture 182 into which the tobacco stalk may be accepted and thus enclosed. Semicircular cutting knives 184, having a vertical cutting edge, may be secured to the right-hand and left-hand members 170 and 172 by means of a transversely extending, threaded bolt 186 and a nut 188 located in counterbores 190 in the sides of the members 170 and 172.

It is important that the bevel 189, which forms the cutting edge of the blades 184, slope away from the cutting area 182. The leaves of the tobacco plants grow generally upwardly from the stalk, and a bevel which provides a surface substantially parallel thereto tends to lift and bruise the leaves against the stalk in the cutting operation. This tendency may be increasingly prevalent as the cutting edges of the blades 184 are dulled through use.

The bolts 186 may be welded to the blades 184 and inserted from the cutting area 182 into the bore 192. The blades 184 may thus be easily and quickly replaced by removing the nuts 188, replacing the blades 184, and then again threading the nuts 188 on the bolt 186 within the counterbore 190.

As shown in FIG. 7, the leading edge 194 of the circular blade 184, on the upper or left-hand member 172, may be faired smoothly into the cam surface 180 to prevent damage to the stalk as the stalk exits the cutting area 182, in the manner subsequently described in connection with FIGS. 9, 10 and 11.

The upper or left-hand member 172 may be spring biased into a predetermined position with respect to the lower or right-hand member 170 by means of a coil spring 192 or other appropriate tension member. Since the right-hand member 170 is biased by the coil spring 178 into a predetermined position relative to the harvester, the left-hand member 172 also assumes a predetermined position with respect thereto. This predetermined position of the member 170 and 172 is, of course, the forward facing or stalk-receiving position of the cutter 132.

A cam surface 196 may also be provided on the rear of the left-hand member 172 for controlling the vertical movement of the cutting head 132, as well be hereafter described in connection with FIGS. 9, 10 and 11.

Referring now to FIGS. 9, 10 and 11, whereby the operation of the cutting head 132 is illustrated, the stalk 195 of a tobacco plant is received between the right-hand and left-hand members 170 and 172 when the harvester is properly aligned with the rows of tobacco plants. As shown in FIG. 9, the cam surface 180 of the right-hand member 170 may be exaggerated in length to assist feeding of the stalk into the cutting area 182 in the event of misalignment. The length of the cam surface 180 of the lower or left-hand member 172 is preferably shorter to prevent damage to the stalk upon the release thereof by the cutting head 132, as will be explained, and to reduce the delay after the cutting operation in resuming the forward facing or stalk-receiving position.

With continued reference to FIG. 9, and assuming that the stalks have been gripped by the belts 146 described in connection with FIGS. 3 and 6, the pressure of the stalk 195 on the cam surface 180 of the left-hand member 172 will overcome the tension in the spring 192 connecting the left-hand member 172 to the right-hand member 170, thereby causing the left-hand member 172 to be displaced therefrom. The two cutting members of the cutting head 132 will thus open to allow the tobacco stalk to enter the cutting area 182 and, as illustrated in solid lines in FIG. 9, the left-hand member 172 will again assume its initial position under the bias of the spring 194.

The continued forward movement of the harvester will cause the stalk 195 to again apply pressure to the vertical surface on the blade 184 of the left-hand member 172, causing the member 170 to pivot about the shaft 174. Since the bias of the left-hand member 172 to the right-hand member 170, by the coil spring 192, is greater than the bias of the right-hand member 170 to the harvester by means of the coil spring 178 (not shown), the right-hand member 170 will follow the left-hand member 172 as it turns about the shaft 174 with the forward movement of the harvester.

When the cam surface of the left-hand member 172 contacts the extension 200 of the switch arm 202 in a counterclockwise direction, as illustrated in FIG. 10, the extension 200 forces the switch arm 202 into engagement with the contacts 204 on the switch body 206. The extension 200 is pivotally secured to the switch arm 202 by a pin 208, but is prevented from pivoting about the pin 208 in a clockwise direction due to the presence of a mechanical stop 210 on the switch arm 202. Engagement of the switch arm 202 with the contacts 204 energizes an electrical circuit to effect the cutting operation by lifting of the entire cutting head assembly 132, as will be explained in connection with FIG. 12.

With continued reference to FIG. 10, the counterclockwise rotation of the members 170 and 172 of the cutter head 132 continues during the vertical lifting thereof and until the mechanical stop 176 of the right-hand member 170 contacts a stop 212 on the frame of the harvester. Additional forward movement by the harvester continues the counterclockwise rotation of the left-hand member 172, thus separating the left-hand member 172 from the right-hand member 170, and allowing the stalk of the tobacco plant to escape the cutting area 182, as shown in FIG. 11.

Once the pressure of the stalk against the cam surface 180 of the left-hand member 172 has been removed, the left-hand member 172 will swing under the bias of the spring 192 back into its position adjacent the right-hand member 170. Both members 170 and 172 will then return together to their forward facing or stalk-receiving position under the bias of the coil spring 178 (not shown).

The cam surface 196 of the left-hand member 172 will again contact the extension 200 of the switch arm 202 as the members 170 and 172 pivot to their forward facing position. Since, however, the extension 200 is free to pivot about the pin 208 in the switch arm 202 in a counterclockwise direction, the engagement of the extension 200 by the cam surface 196 in a clockwise direction does not establish contact between the switch arm 202 and the contacts 204 on the switch body 206. Thus, the apparatus controlling the vertical positioning of the cutting head 132 is not energized as the cutting head 132 reassumes its forward facing or stalk-receiving position.

With reference now to FIG. 12, the entire cutting head assembly 132 may conveniently be mounted on a platform 220 which extends laterally from a C-shaped member comprising a crossbar 222 and a pair of vertically depending cylinders 224. Each of the cylinders 224 may be adapted to receive a vertical rod or guide rail 226 which extends upwardly from a base 228 adapted to be mounted on the central movable platform 25. A small electric motor 230 may be secured in a conventional manner to the base 228, e.g. by nuts and bolts 232. The shaft 234 of the motor 230 may be provided with a flywheel 236 which may, in turn, have a plurality of pins 238 horizontally extending therefrom.

A rigid bar 240 may be adapted to be selectively secured at its lower end to one of the pins 238 on the flywheel 236 of the motor 230. The bar 240 may be pivotally secured at its upper end 242, to an extension 244 of the crossbar 222, by a pin 246.

The motor 230 may be of the type which rotates one full cycle upon the energization thereof, and may be connected by wires 248 to the switch 206. Upon the engagement of the switch arm 202 with the contacts 204, as earlier described in FIGS. 10 and 11, the shaft 234 of the motor 230 will rotate 360°, thus rotating the flywheel 236 and causing the C-shaped member to rise with respect to the base 228 by the force of the rod 240. A suitable tensioning member such as a coil spring 250 may be utilized between the bar 222 and the end 252 of the rods 226 to ensure the rapid downward return of the cutting head 132 after initiation of the motor 230.

Alternative to the above arrangement, the C-shaped member may be replaced by any suitable guides, and the cutting head 132 lifting force supplied by a suitable conventional hydraulic or pneumatic motor.

A second embodiment of the cutting head 132 is illustrated in FIGS. 13—16. With reference now to FIG. 13, a pair of oppositely facing, C-shaped members 254 may be carried respectively by the center and side movable platforms.

A pair of cantilevered arms 256 may be supported respectively on rods 258 extending through apertures in the ends of the C-shaped members 254. These arms 256 may be urged to the forward end of the harvester by a pair of springs 260 coiled about the rods 258.

Oppositely facing extensions 262 may be connected to the ends of the arms 256 by means of a pin 264 for pivotal movement in the horizontal plane. This pivotal movement may be resisted by a pair of leaf springs 266 carried by each of the arms 256 and extending respectively along the front and rear surfaces of the extensions 262.

A pair of oppositely facing serpentine cutting elements 268 may be rigidly connected to the extensions 262. These elements 268 cooperate to provide a generally circular, central cutting area 270 at the center of the elements 268 and opposing, forward facing, cam surfaces 272 at the front end thereof. A similar pair of cam surfaces 274 may be provided at the rear ends of the elements 268 to prevent damage to the stalk upon the egress thereof from the cutting area 270.

The cutting elements 268 may be constructed, for example, of steel plate approximately 1 to 1½ inches wide in the vertical plane. The actual cutting edges need, of course, to extend only over the portion of the elements 268 which define the cutting area 270, and the edge of the steel plate may be beveled as earlier discussed in connection with the cutting head of FIGS. 7 and 8.

The cutting elements 268 may easily be removed for sharpening and/or replacement by removal of the pins 264 which will free the extension 262.

Operation of the cutting head is illustrated in FIGS. 14–16. In FIG. 14, a stalk 276 is shown engaging the forward facing cam surfaces 272 of the cutting elements 268. The pressure created by the forward movement of the harvester will overcome the spring bias of the leaf springs 266 and cause the cutting elements 268 to pivot apart, admitting the stalk 276 into the cutting area 270 as illustrated in FIG. 15.

Continued forward movement of the harvester will cause the stalk 276 to press against the flat surface of the elements 268 within the cutting area 270 with sufficient force to overcome the bias of the leaf springs 266, thereby spreading the cutting elements 268 and allowing egress of the stalk 276 from the cutting area 270 as illustrated in FIG. 16.

Some freedom of backward travel may be provide for the cutting elements 268 by means of the coil springs 260 shown successively compressed in FIGS. 14, 15 and 16. The forward movement of the arms 256 upon release of the stalk 276, together with the wedging action of the rearward facing cam surfaces 274, materially reduces the likelihood of damage to the stalk 276 upon the egress thereof from the cutting area 270.

The upward movement of the cutting heads may be triggered by any suitable stalk detecting means and should be accomplished during the period of time when the stalk 276 is in the cutting area 270 and while the cutting elements 268 are moving backward against the coil springs 260. The relative strength of the coil springs 260 and the leaf springs 266 may be adjusted to effect this result.

Figure 17:
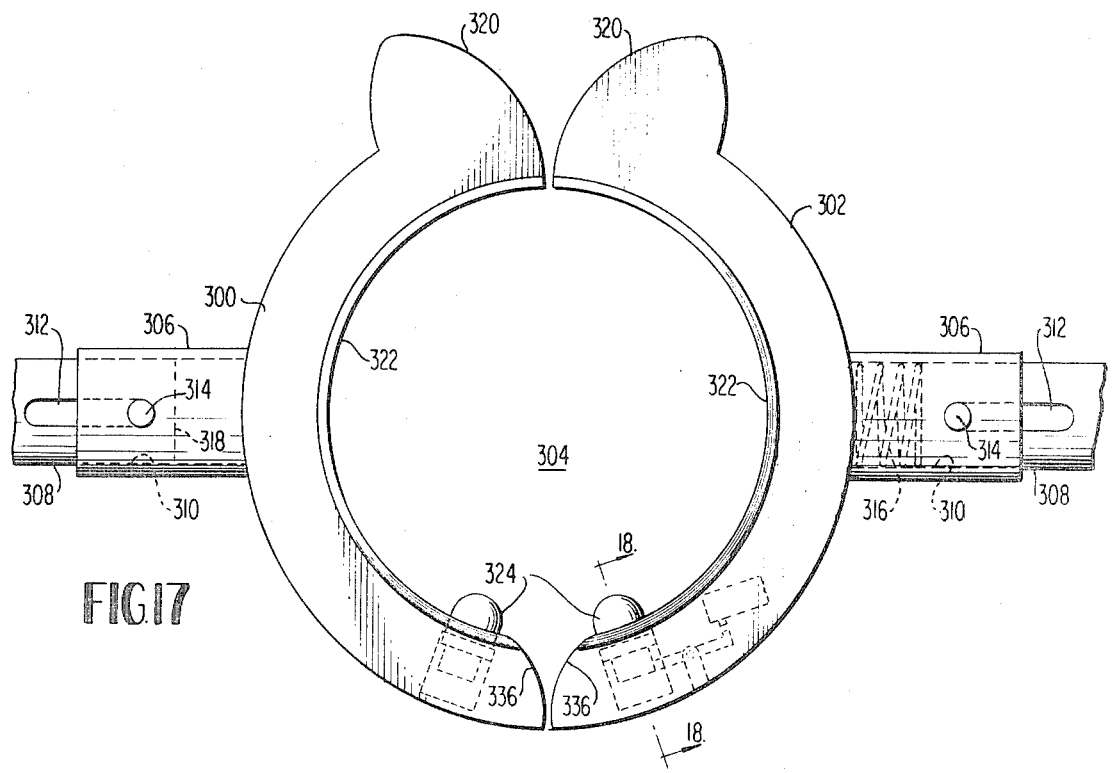
FIG. 17 is a top plan view of a third embodiment of the cutting head of the present invention.
Figure 18:
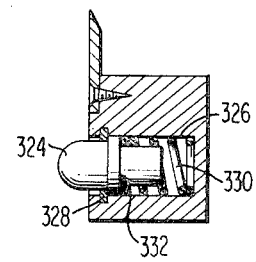
FIG. 18 is a section taken through lines 18—18 of FIG. 17.

A third embodiment of the cutting head of the present invention is illustrated in FIGS. 17 and 18. With reference now to FIG. 17, the cutting head may comprise a pair of generally C-shaped members 300 and 302 which cooperate to define the cutting area 304. These C-shaped members 300 and 302 may, as in the embodiment of FIG. 13, be supported from opposite sides of the row of tobacco plants by horizontally extending tubular members 306 in which laterally extending rods 308 are telescoped. These rods 308 may in turn be supported from spring-biased, C-shaped members (not shown), as in the embodiment of FIG. 13, to provide for forward and rearward movement of the cutting head, if desired.

The rods 308 are provided adjacent their laterally inward extremity 310 with a longitudinal slot 312 through which a pin 314 in the tubular members 306 is adapted to slide. A spring 316 may be inserted between the ends 318 of the rods 308 and the C-shaped members 300 and 302 to bias the C-shaped members laterally inward with respect to the rods 308.

The forward facing ends of the C-shaped members 300 and 302 may be provided with oppossing, stalk engaging, cam surfaces 320. As in the embodiments earlier described, the C-shaped members 300 and 302 may each be provided with a removable semicircular knife 322 having, as illustrated in FIG. 18, a cutting edge beveled upwardly towards the cutting area 304, for the reasons earlier explained.

As shown more clearly in FIG. 18, a switch actuator 324 may be carried in the rearward end of the C-shaped members 300 and 302. The actuators 324 extend into the cutting area 304 and are adapted to telescope into a rearwardly extending bore 326 in the C-shaped members 300 and 302 under pressural engagement with the stalk of a tobacco plant. A suitable conventional locking ring 328 may be provided to resist the outward bias of the springs 330 provided within the bores 326 and acting against the shoulders 332 of the actuators 324.

In operation, the cutting head of FIG. 17 in its normal or closed position may receive the stalk of a tobacco plant to be defoliated between the opposing cam surfaces 320. The wedging action of the tobacco stalk against these surfaces 320 will, of course, force the C-shaped members 300 and 302 laterally apart against the bias of the springs 316 to admit the stalk into the cutting area 304. Rearward movement of the entire assembly may be possible during this separation if the spring-biased mounting of the C-shaped members illustrated in FIG. 13 is utilized.

Pressural engagement of the stalk of the tobacco plant within the cutting area 304, against the switch actuators 324, may close, in a conventional manner, suitable electrical switch contacts 334 to cause the C-shaped members 300 and 302 of the cutting head to be vertically lifted over the predetermined cutting swath.

Upon the return of the cutting head to the lower vertical position, the pressural engagement of the stalk against the opposing cam surfaces of the rearward ends of the C-shaped members 300 and 302 will again overcome the bias of the springs 316 and cause the lateral separation of the C-shaped members. Further actuation of the cutting head lifting mechanism earlier described may be prevented by a suitable conventional delay mechanism. The multiple actuation of the cutting head lifting apparatus during a predetermined time interval may thus be prevented.

Figure 19:
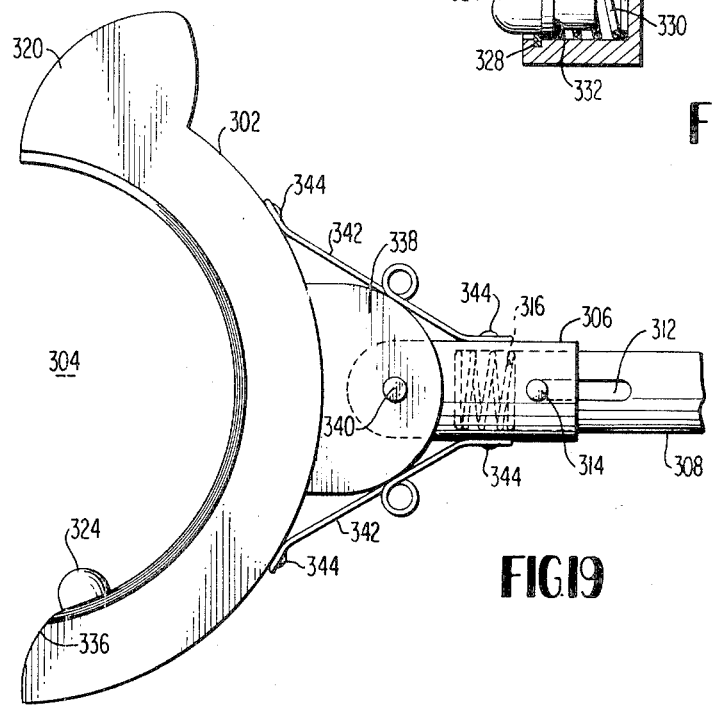
FIG. 19 is a top plan view of a modification of the cutting head of FIG. 17 for pivotal as well as lateral movement.

A modification of the embodiment of FIG. 17 is illustrated in FIG. 19, wherein the like-numbered elements have been given like designations to facilitate an understanding thereof and wherein the tubular member 306 is pivotally secured to a lateral projection 338 of the C-shaped member by a pin 340, rather than being rigidly connected thereto. A pair of spring members 342, secured in a conventional manner, e.g. by metal screws 344, may be provided to bias the C-shaped member 302 to a predetermined position with respect to the tubular telescoping member 306. The modification of FIG. 19 permits the pivoting of the two C-shaped members 300 and 302 laterally apart to facilitate the admission of the stalk of the tobacco plant into the cutting area 304 and the subsequent egress of the stalk therefrom. This feature may be utilized as a substitute for, or may be utilized in addition to, the spring-biased, C-shaped support constructions illustrated in FIG. 13 and earlier described.

LEAF ORIENTING

In addition to the variable height containers described infra, the harvester of the present invention may be provided with the novel leaf orienting apparatus illustrated in FIGS. 22 and 23.

With reference now to FIG. 22, a conveyor system for transporting the harvested leaves from the area of the cutting head 132, to the containers 102 of FIG. 3, may comprise a plurality of spaced, parallel, endless belts or, as an alternative, an open grid through which air may be upwardly drawn. A hood 350 may be supported over the apertured conveyor 352 by means of a conventional system including a winch 354 and an idler pulley 356 supported from the frame of the harvester in a conventional manner.

An electric motor 358, which may derive its power from the prime motor of the harvester, may be provided within the hood 350 and oriented so that the multiple bladed fan 360 driven thereby creates an updraft of air through the conveyors 352 and through the apertures 362 in a baffle 364 at the bottom of the hood 350. The apertures 362 in the baffle 364 may be varied in cross section and in spacing to regulate the degree of updraft over the length of the conveyor 352, as desired.

Supplemental updraft creating means, such as a conduit 366, having a plurality of nozzles 368, may be positioned beneath the conveyor 352 or between the various endless belts thereof, as desired. Compressed air for this purpose may be provided by suitable tanks (not shown) or by a conventional compressor driven by the harvester prime mover.

In operation, the leaves 370 harvested from the tobacco plants will assume various orientations on the conveyor 372, depending upon their relationship to the stalk of the plant. These randomly oriented leaves 370 will be transported by an upwardly extending section of the conveyor onto the grid section 352 of the conveyor, whereupon the leaves 370 will be subjected to the updraft created by the fan 358.

The hood 350 may, of course, be lowered by the line 374, extending over the idler pulley 356 to the wench 354, and the wrench 354 locked in any desired position by a conventional locking mechanism (not shown). The updraft may in this manner be regulated. Additionally, the updraft may be augmented by the compressed air from the nozzles 368 of the conduit 366. The direction of the air from the nozzles 368 may be oriented in opposition to the direction of movement to the upper surface of the conveyors 354 to facilitate orientation of the leaves.

The combined updraft is such that the broad and lightweight section of each of the leaves is lifted above the surface of the conveyor 352. The entire leaf may be lifted in this manner, if desired, by adjusting the force of the updraft. However, it is only necessary that the broad portion 376 of the leaf be lifted and that the moving conveyor retain, or first engage, the heavy butt end 378 of the tobacco leaves. In this manner, the butt end 378 of the leaves will be pulled forward by the conveyor belt 352 and the leaves deposited into the container 380 with a common, butt first, orientation. The subsequent removal of the leaves from the container will be thus greatly facilitated.

As an alternative arrangement, consider the arrangement illustrated in FIG. 23, wherein the leaves 370 may be dropped from one moving conveyor 382 to a second moving conveyor 384. The height differential between the conveyors 382 and 384 must be sufficient for the natural resistance of the air against the broad and lightweight portion 386 of the leaves to effect the necessary substantially vertical orientation prior to engagement of the butt 388 of the leaves with the moving surface of the conveyor 384.

Compressed air from a plurality of nozzles 390 may be utilized to assist in the orientation of the leaves. The height differential between the conveyors 382 and 384 may thus be lessened.

THE CONTAINERS

The containers 102 and 412 illustrated in FIGS. 1, 2, 3 and 5 may be modified in the manner illustrated in FIG. 24. With reference to FIG. 24, each of the containers 102 may be provided with suitable lateral edges 278 overhanging the rearwardly extending members 98.

The members 98 may be provided with upward extending rods 280 depending therefrom which project through apertures 282 in the edges 278. Coil springs 283 may be utilized to oppose the settling of the edges 278 against the members 98.

The container 102 may thus be urged upwardly with respect to the members 98 so that a leaf 284 of tobacco conveyed over the shaft 112 will have only a short vertical fall to the bottom 286 of the container 102.

As subsequent leaves are harvested and deposited into the container 102, the weight of the container will increase gradually, overcoming the bias of the springs 283, and thus gradually lower the containers 102 with respect to the members 98 and to the shaft 112 journaled therebetween.

In this manner, the vertical drop from the shaft 112 to the level of leaves in the container 102 is maintained relatively small. Damage to previously harvested leaves, due to the tendency of subsequently harvested leaves to fall butt therethrough, may thus be materially lessened.

Referring to FIG. 21, the spring-biased means illustrated in FIG. 20 may be replaced by a suitable pneumatic or hydraulic ram 288 mounted on the members 98 and extending upwardly to support the edges 278 of the container 102. The weight of the container 102 may be sensed by a suitable load cell 290 and the signal resulting therefrom conveyed over wires 292 to control the flow of fluid through the lines 294 from a conventional source of pressure (not shown).

Alternatively, the containers may be rigidly secured to the member 98 and the containers provided with a false floor upwardly spring biased when empty to a position near the top of the container.

I claim:

1. A mechanical tobacco harvester comprising:
    a frame movable along a row of tobacco plants;
    a vertically positionable platform carried by said frame;
    a cutting head carried by said platform in position to successively engage the stalks of the tobacco plants in said row, said cutting head including a pair of laterally separable members cooperating to define a cutting area of sufficient size to a accommodate the stalk of a tobacco plant in said row when in a predetermined coplanar position with respect to each other and means for biasing said members into said predetermined position, said members being separable upon pressural engagement with each stalk into said row to permit access to and egress from said cutting area; and
    means for vertically moving said cutting head over a predetermined vertical swath to separate the leaves from the stalk within said cutting area.
2. The harvester of claim 1 including a container for the leaves separated from the stalk,
    means for conveying the harvested leaves from said cutting head to said container, and
    means for varying the height of said conveyor means with respect to said container.
3. The harvester of claim 2 wherein said height varying means is responsive to the weight of the leaves in said container.
4. The harvester of claim 1 including:
    a plurality of ground-engaging wheels, mounted on said frame
    means for controlling the angle of one of said wheels with respect to said frame,
    a source of power carried by said frame,
    means for drivingly connecting said source of power to at least one of said wheels, and
    an operator's station carried by said platform for selectively operating said wheel angle controlling means.
5. The harvester of claim 1 including:
    a plurality of ground-engaging wheels;
    a source of power carried by said frame;
    means for drivingly connecting said source to at least one of said wheels,
    means for determining the relative position of said cutting head to the next succeeding stalk in said row of tobacco plants, and
    means for selectively controlling the angle of one of said wheels with respect to the axis of said frame responsively to said position determining means.
6. The harvester of claim 5 wherein said position determining means includes stalk-sensing means carried by said platform forward of said cutting head on both sides of said row of tobacco plants for generating a control signal upon pressural engagement with the stalk of a tobacco plant in said row.
7. The harvester of claim 6 wherein said stalk-sensing means includes a plurality of horizontally deflectable endless belts driven rearwardly at substantially the same speed as the forward speed of said frame with respect to said row to substantially eliminate relative movement between said stalk and said belts.
8. The harvester of claim 7 wherein the spacing between said belts in the area of said cutting head is slightly less than the diameter of a stalk in said row of plants whereby said stalk is supported during the separation of the leaves therefrom.
9. The harvester of claim 1 including leaf-orienting means carried by said frame comprising:
    conveyor means for transporting the leaves separated from the stalks of the tobacco plants,
    means for creating an updraft sufficient to lift at least the major portion of each leaf above said conveyor means whereby continued movement of said conveyor means orients the leaves heavy end in the direction of movement of said conveyor means.
10. The harvester of claim 9 wherein said updraft has a horizontal component in a direction opposite to the direction of movement of said surface.
11. The harvester of claim 9 including means for varying the velocity of said updraft over at least a portion of the length of said surface.
12. The harvester of claim 1 including leaf-orienting means comprising:
    a moving surface;
    conveyor means adapted to drop the leaves separated from the stalks of the tobacco plants upon said surface, the vertical separation of said conveyor means and said surface being sufficient for said leaves to assume a butt downward position whereby the butt of each leaf engages said surface prior to the remainder thereof.
13. The harvester of claim 1 including spring means for permitting rearward movement of said members in a substantially horizontal plane in response to pressural engagement with each stalk in said row.
14. The harvester of claim 1 including means for permitting pivotal movement of said members in a substantially horizontal plane in response to pressural engagement with each stalk in said row.
15. The harvester of claim 1 including means for permitting clockwise and counterclockwise pivoting of said members and rearward movement of said members in a substantially horizontal plane in response to pressural engagement with each stalk in said row.
16. A cutting head for harvesting leaves from a tobacco plant comprising:
    first and second members cooperating to define a cutting area of sufficient size to accommodate the stalk of a tobacco plant when in a predetermined position with respect to each other; and means operable only when said members are in said predetermined position for vertically moving said members over a predetermined cutting swath;
    said members being separable upon pressural engagement with the stalk of a tobacco plant to admit the stalk into said cutting area and being separable following the vertical movement of said members to permit the egress of said stalk from said cutting area.

17. The cutting head of claim 16 wherein said members are moved vertically upward and including removable knife means carried by said members substantially enclosing said cutting area, said knife means being beveled generally upwardly toward said cutting area to define a cutting edge.

18. The cutting head of claim 16 wherein at least one of said members pivots away from the other of said members in a generally horizontal plane responsively to said pressural engagement to admit the stalk into said cutting area, wherein both of said members pivot in the same direction in said plane during the vertical movement thereof, and including means for limiting the angle through which one of said members may pivot in said plane, the continued pivoting of the other of said members in the same direction in said plane separating said members to allow egress of the stalk from said cutting area.

19. The cutting head of claim 16 wherein said members are pivotable in said plane about a common axis, and wherein said means for vertically moving said members includes a switch means responsive to the pivoting of one of said members for controlling the vertical movement of said members.

20. The cutting head of claim 19 wherein at least one of said members pivots responsively to said pressural engagement to admit the stalk into said cutting area,
wherein said members are moved vertically upward a predetermined distance,
including knife means carried by said members substantially enclosing said cutting area, said knife means beveled generally upwardly toward said cutting area to define a cutting edge, and
including means for limiting the angle through which one of said members may pivot whereby continued pivoting of the other one of said members separates said members to allow egress of the stalk from said cutting area.

21. The cutting head of claim 16 wherein said members are pivotable in opposite directions about substantially vertical axes in a common, substantially horizontal plane in response to said pressural engagement to admit the stalk into said cutting area.

22. The cutting head of claim 21 wherein said members pivot in one direction to admit a stalk and pivot in the opposite direction to permit the egress of the stalk from said cutting area.

23. The cutting head of claim 22 wherein said members are moved vertically upward and including removable knife means carried by said members, said knife means being beveled upward toward said cutting area to define a cutting edge.

24. The cutting head of claim 16 wherein said members are laterally separable upon pressural engagement with the stalk.

25. The cutting head of claim 16 wherein said members are laterally pivotably separable in opposite directions upon pressural engagement with the stalk.

26. The cutting head of claim 16 including switch means carried by said members for vertically moving said members.

27. The cutting head of claim 26 wherein said members are laterally separable upon pressural engagement with the stalk, including knife means carried by said members and beveled generally upwardly toward said cutting area to define a cutting edge.

28. The cutting head of claim 27 wherein said members are moved generally upward and wherein said members also pivot oppositely in response to pressural engagement with the stalk.

* * * * *